United States Patent
Mandal et al.

(10) Patent No.: US 11,271,728 B2
(45) Date of Patent: Mar. 8, 2022

(54) SECURE KEY MANAGEMENT

(71) Applicant: FUJITSU LIMITED, Kawasaki (JP)

(72) Inventors: Avradip Mandal, San Jose, CA (US);
Arnab Roy, Santa Clara, CA (US);
Hart Montgomery, Redwood City, CA (US)

(73) Assignee: FUJITSU LIMITED, Kawasaki (JP)

( * ) Notice: Subject to any disclaimer, the term of this patent is extended or adjusted under 35 U.S.C. 154(b) by 236 days.

(21) Appl. No.: 16/723,140

(22) Filed: Dec. 20, 2019

(65) Prior Publication Data

US 2021/0194676 A1  Jun. 24, 2021

(51) Int. Cl.
*H04L 9/08* (2006.01)
*H04L 9/30* (2006.01)
*H04L 9/32* (2006.01)

(52) U.S. Cl.
CPC ............ *H04L 9/085* (2013.01); *H04L 9/0894* (2013.01); *H04L 9/30* (2013.01); *H04L 9/321* (2013.01); *H04L 9/3247* (2013.01)

(58) Field of Classification Search
None
See application file for complete search history.

(56) References Cited

U.S. PATENT DOCUMENTS

| 2018/0004930 | A1  | 1/2018  | Csinger et al. |            |
|--------------|-----|---------|----------------|------------|
| 2020/0044863 | A1* | 2/2020  | Yadlin         | H04L 9/085 |
| 2020/0213113 | A1* | 7/2020  | Savanah        | H04L 9/3073 |
| 2020/0389306 | A1* | 12/2020 | Dolan          | H04L 9/3066 |
| 2021/0083872 | A1* | 3/2021  | Desmarais      | G06Q 20/3829 |
| 2021/0152371 | A1* | 5/2021  | Fletcher       | H04L 9/3247 |

FOREIGN PATENT DOCUMENTS

WO  2019/193452 A1  10/2019

OTHER PUBLICATIONS

Boneh, Dan, Ben Lynn, and Hovav Shacham. "Short signatures from the Weil pairing." International Conference on the Theory and Application of Cryptology and Information Security. Springer, Berlin, Heidelberg, 2001.
Shamir, Adi. "How to share a secret." Communications of the ACM 22.11 (1979): 612-613.

(Continued)

*Primary Examiner* — Benjamin E Lanier
(74) *Attorney, Agent, or Firm* — Maschoff Brennan

(57) ABSTRACT

A method may include obtaining a secret key, a user device secret key, and a server secret key based on the secret key and the user device secret key. The method may include dividing the user device secret key into a plurality of user device shares and the server secret key into a plurality of server shares. The method may include distributing the plurality of user device shares to a plurality of user devices and the plurality of server shares to a plurality of service providers. The method may include obtaining a public key based on the secret key. The method may also include publishing the public key. The method may include obtaining a recovery authority secret key and a recovery vault secret key such that a user may recover an account if the user devices and/or the service providers are compromised.

20 Claims, 7 Drawing Sheets

(56) References Cited

OTHER PUBLICATIONS

Boldyreva, Alexandra. "Threshold signatures, multisignatures and blind signatures based on the gap-Diffie-Hellman-group signature scheme." International Workshop on Public Key Cryptography Springer, Berlin, Heidelberg, 2003.
Boneh, D., Gentry, C., Lynn, B., & Shacham, H. (May 2003). Aggregate and verifiably encrypted signatures from bilinear maps. In International Conference on the Theory and Applications of Cryptographic Techniques (pp. 416-432). Springer, Berlin, Heidelberg.
European Search Report dated May 11, 2021 as received in application No. 20190460.
EP Search Report in Application No. 20190460.4 dated Feb. 8, 2021.

* cited by examiner

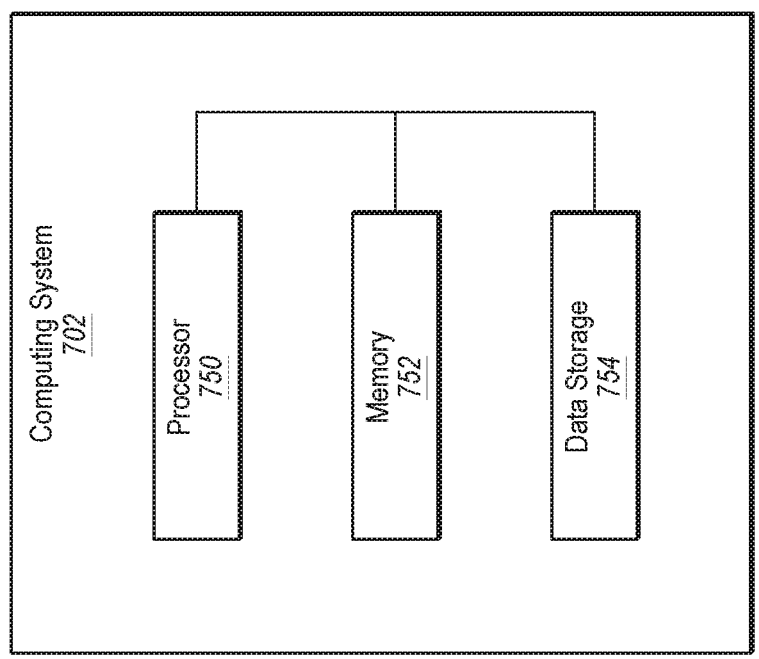

SECURE KEY MANAGEMENT

FIELD

The embodiments discussed in the present disclosure are related to secure key management.

BACKGROUND

Cryptographic keys, such as those used on blockchains, are increasingly targeted by individuals attempting to steal users' valuable data. Both targeted and untargeted attacks are common and may disrupt an individual's ability to engage in transactions or access his or her investments. A secure key management system may increase the security of a user's cryptographic keys while also allowing the user to continue to conveniently engage in desired financial transactions.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

A method may include obtaining a secret key, a user device secret key, and a server secret key based on the secret key and the user device secret key. The method may include dividing the user device secret key into a plurality of user device shares and the server secret key into a plurality of server shares. The method may include distributing the plurality of user device shares to a plurality of user devices and the plurality of server shares to a plurality of service providers. The method may include obtaining a public key based on the secret key. The method may also include publishing the public key such that a third-party can verify a message based on the public key, a user device signature obtained from a subset of the plurality of user devices, and a server signature obtained from a subset of the plurality of service providers. The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 7 illustrates a block diagram of an example computing system that may be configured to operate a secure key management system.

DESCRIPTION OF EMBODIMENTS

Figure 1:
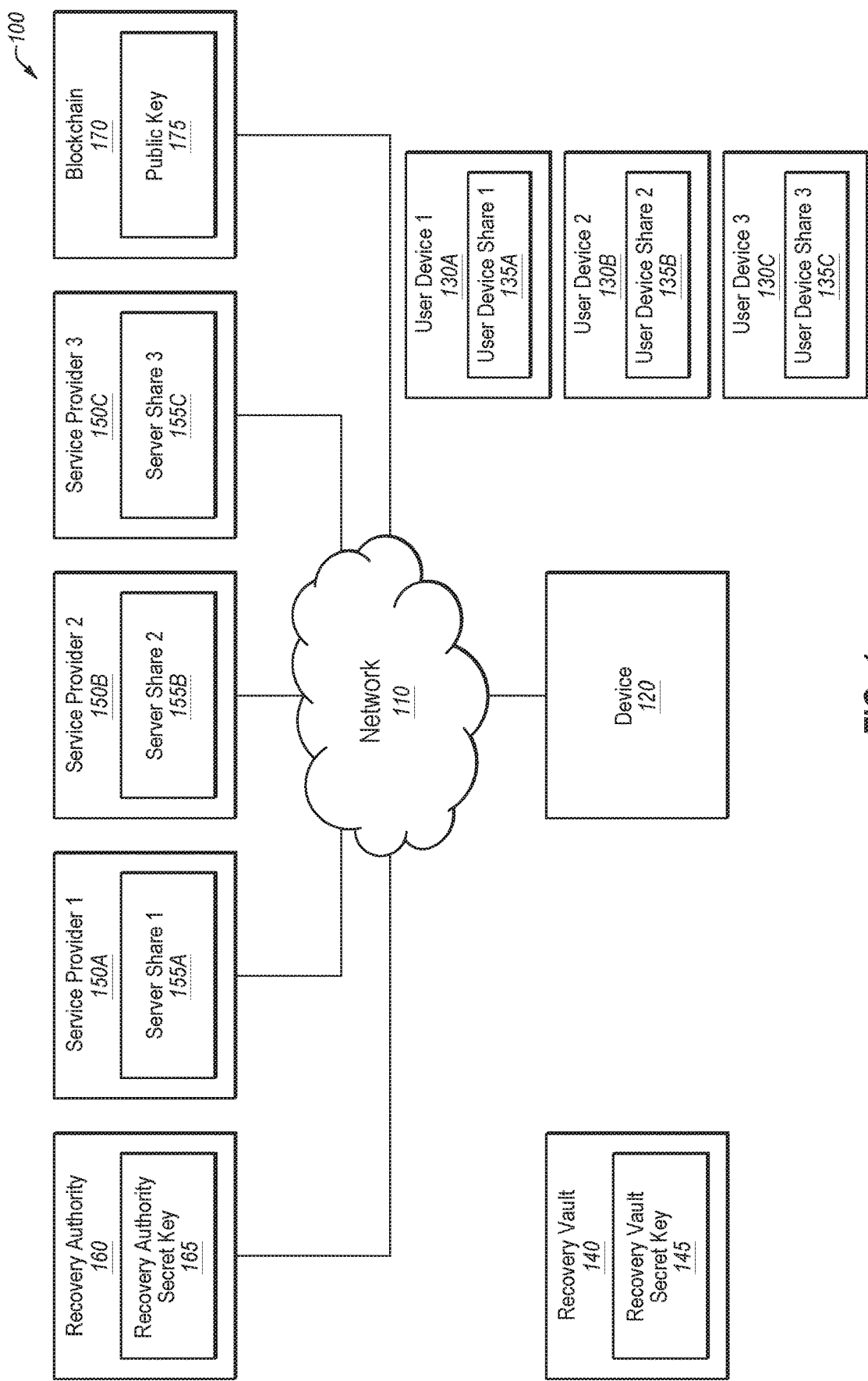
FIG. 1 is a diagram representing an example environment related to secure key management.

Some embodiments described in the present disclosure relate to methods and systems of secure key management. Cryptographic keys may be used to participate in secure transactions over a network such as, for example, blockchain transactions. Cryptographic keys are becoming increasingly important as individuals continue to invest in digital currencies and engage in transactions across networks. For example, platforms may use cryptographic keys to provide secure transactions and to verify that a transaction has been authorized by the account holder or a representative of the account holder, and to verify the details of the transaction.

Platforms that use cryptographic keys are home to an increasingly valuable amount of wealth. However, as blockchains and other platforms increase in popularity and are a repository to increasing amounts of wealth, hackers and other nefarious individuals are targeting cryptographic keys in an attempt to siphon investments away from the users of these platforms for their own gain. By employing both targeted and untargeted attacks, hackers may surreptitiously obtain an individual user's credentials, such as a user name and password, that may allow the hackers to then obtain the user's cryptographic key. The hackers may then engage in transactions against the will of the user of the account, resulting in financial losses or other losses. And once a user's credentials have been compromised, it may be difficult both to prevent the unauthorized access to the account even after it is discovered and to recover the user's own authorized access to the account.

Secure key management may improve the security and reliability of the system to prevent a user's cryptographic key from being compromised, to allow a user to prevent unauthorized transactions in the event the cryptographic key is compromised, and to enable a user to recover after the cryptographic key is compromised and/or after the user has prevented unauthorized transactions.

To help prevent the user's cryptographic key from being compromised, shares of the cryptographic key may be distributed among several user devices of the user and among several service providers. By distributing shares of the cryptographic key across several different user devices and service providers, hackers may be unable to obtain possession of the cryptographic key without also obtaining possession of multiple different user devices of the user and without defeating security systems associated with multiple service providers. For example, a cryptographic key may be divided into five shares and each share may be distributed to a different user device of five user devices. The cryptographic key may be reconstructable from any three shares of the cryptographic key. Thus, to compromise the cryptographic key, hackers may need to obtain at least three user devices of the user, improving the security of the cryptographic key. The cryptographic key may similarly be divided into shares and distributed to multiple service providers.

Additionally, to allow a user to prevent unauthorized use of the cryptographic key in the event the cryptographic key is compromised, the user may contact various service providers.

Additionally, secure key management may allow a user to recover an account associated with a cryptographic key after a hacker has compromised the account and/or after the user has contacted the service providers to disable the account.

Embodiments of the present disclosure are explained with reference to the accompanying drawings.

FIG. 1 is a diagram representing an example environment 100 related to secure key management and in particular key generation. The environment 100 may include a network 110; a device 120; a user device 1 130A, a user device 2 130B, and a user device 3 130C (collectively the user devices 130); a recovery vault 140; a service provider 1 150A, a service provider 2 150B, and a service provider 3 150C; a recovery authority 160; and a block chain 170.

The network 110 may include any communication network configured for communication of signals between any of the components (e.g., the device 120 and the service providers 150) of the environment 100. The network 110 may be wired or wireless. The network 110 may have numerous configurations including a star configuration, a token ring configuration, or another suitable configuration. Furthermore, the network 110 may include a local area network (LAN), a wide area network (WAN) (e.g., the Internet), and/or other interconnected data paths across which multiple devices may communicate. In some embodiments, the network 110 may include a peer-to-peer network. The network 110 may also be coupled to or include portions of a telecommunications network that may enable communication of data in a variety of different communication protocols.

In some embodiments, the network 110 includes or is configured to include a BLUETOOTH® communication network, a Z-Wave® communication network, an Insteon® communication network, an EnOcean® communication network, a wireless fidelity (Wi-Fi) communication network, a ZigBee communication network, a HomePlug communication network, a Power-line Communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 110 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the device 120, the service providers 150, a cloud server communication, or a gateway.

The device 120 may include a computer-based hardware device that includes a processor, memory, and communication capabilities. The device 120 may be coupled to the network 110 to communicate data with any of the other components of the environment 100. Some examples of the device 120 may include a mobile phone, a smartphone, a tablet computer, a laptop computer, a desktop computer, a set-top box, a virtual-reality device, or a connected device, etc. The device 120 may include a processor-based computing device. For example, the device 120 may include a hardware server or another processor-based computing device configured to function as a server. The device 120 may include memory and network communication capabilities. In some embodiments, the device 120 may include a computing system such as described below with respect to FIG. 7.

In some embodiments, the device 120 may be configured to obtain multiple secret keys. For example, in some embodiments, the device 120 may obtain a combined secret key, s, a user device secret key, $s_0$, and a recovery vault secret key 145, $r_0$. In these and other embodiments, the combined secret key, the user device secret key, and the recovery vault secret key 145 may be obtained by sampling from a distribution based on public parameters of the blockchain 170 in the environment 100. For example, the public parameters may include parameters relative to a cryptographic scheme, such as parameters describing how secret keys may be generated. In some embodiments, the public parameters may include an order, q, which may be an integer, such as a prime integer. The public parameters may also include multiple bilinear groups such as $G_1$, $G_2$, and $G_T$. In some embodiments, one or more of the bilinear groups $G_1$, $G_2$, and $G_T$ may be groups of order q. Alternatively, in some embodiments, $G_1$, $G_2$, and $G_T$ may be groups of different orders. The bilinear groups may also include a deterministic function e, which may be a bilinear map that may take as an input an element of $G_1$ and an element of $G_2$ and may output an element of $G_T$, e: $G_1 \times G_2 \to G_T$. Each of the bilinear groups may include elliptic curves, such as elliptic curve pairing groups recommended by the National Institute of Standards and Technology (NIST) such as the curve P-521, the curve P-384, the curve P-256, or any other elliptic curve. The public parameters may also include g, which may be a generator of $G_1$, and H, which may be a collision resistant hash function (CRHF). In some embodiments, H may be a function that takes as an input a bit string, such as a message, and outputs a group element. For example, H may output an element of $G_1$. In some embodiments, H may be a random oracle. In these and other embodiments, selecting H as a random oracle may improve the security of the environment 100.

The public parameters may also include integers $t_0$, $n_0$, $t_1$, and $n_1$, which may be associated with the secret shares discussed below. For example, the integers $n_0$ and $n_1$ may represent the number of shares into which secret keys may be divided. For example, $n_0$ may represent the number of shares into which the user device secret key $s_0$ may be divided and $n_0$ may represent the number of shares into which the server secret key described below may be divided. The integers $t_0$ and $t_1$ may represent the number of shares of the respective secret keys that must be aggregated to reconstruct the respective secret keys. The integers $t_0$, $n_0$, $t_1$, and $n_1$ may be selected to provide security and ease of use to the environment 100. For example, increasing $t_0$ while $n_0$ remains constant may increase the security of the environment 100. Alternatively, reducing $t_0$ while $n_0$ remains constant may increase the convenience of the environment 100. The combined secret key, the user device secret key, and the recovery vault secret key 145 may be sampled from $Z_q$, where $Z_q$ is the set of non-negative integers less than the order q. For example, each of the secret keys may be a randomly selected integer in $Z_q$.

The device 120 may also be configured to obtain other secret keys based on the combined secret key, the user device secret key, and the recovery vault secret key 145. For example, a server secret key, $s_1$, may be obtained as a difference between the combined secret key and the user device secret key: $s_1 = s - s_0$. Alternatively or additionally, a recovery authority secret key 165, $r_1$, may be obtained as a difference between the combined secret key and the recovery vault secret key: $r_1=s-r_0$. Alternatively or additionally, in some embodiments, the server secret key and the recovery authority secret key 165 may be sampled from $Z_q$ and the user device secret key and the recovery vault secret key 145 may be obtained based as a difference between the combined secret key and the server secret key and the recovery authority secret key 165, respectively. Alternatively or additionally, in some embodiments, the user device secret key and the server secret key may be sampled from $Z_q$ and the combined secret key may be obtained based on a sum of the user device secret key and the server secret key. Alternatively or additionally, in some embodiments, the recovery vault secret key and the recovery authority secret key may be sampled from $Z_q$ and the combined secret key may be obtained based on a sum of the recovery vault secret key and the recovery authority secret key.

In some embodiments, the device 120 may also be configured to obtain shares of secret keys. In these and other embodiments, shares of secret keys may include secret shares as described in Shamir, Adi, *How to share a secret*, Communications of the ACM volume 22 number 11, pages 612-13 (November 1979), which is incorporated by reference in its entirety. For example, the device 120 may divide a secret key into multiple shares such that the secret key may be reconstructed with the aggregation of a subset of the shares. For example, a secret key may be divided into n shares such that the secret key may be reconstructed using k shares (also referred to as a (k, n) threshold scheme). No knowledge of the secret key may be obtained with fewer than k shares and the secret key may be reconstructed even if n−k shares are destroyed and/or lost. In these and other embodiments, to divide a secret key into n shares, the device 120 may select a random k−1 degree polynomial $f \in \mathbb{F}_q[x]$ such that f(0)=secret key. The n shares of the secret key may be determined as f(1), . . . , f(n). Then, using any k shares, the degree k−1 polynomial f may be reconstructed using Lagrange Interpolation and the secret key may be determined as f(0).

In particular, the device 120 may divide the user device secret key into multiple user device shares, such as the user device share 1 135A, the user device share 2 135B, and the user device share 3 135C (collectively the user device shares 135). In some embodiments, the device 120 may divide the user device secret key into no user device shares such that to user device shares are required to reconstruct the user device secret key. Although three user device shares 135 are depicted in FIG. 1, the device 120 may divide the user device secret key into any number of user device shares 135. Alternatively or additionally, the device 120 may divide the user device secret key into user device shares 135 such that any number of user device shares 135 may be required to reconstruct the user device secret key. For example, in some embodiments, one user device share 135 may be required to reconstruct the user device secret key, two user device shares 135 may be required to reconstruct the user device secret key, or three user device shares 135 may be required to reconstruct the user device secret key.

Similarly, the device 120 may divide the server secret key into multiple server shares, such as the server share 1 155A, the server share 2 155B, and the server share 3 155C (collectively the server shares 155). In some embodiments, the device 120 may divide the server secret key into $n_1$ server shares such that $t_1$ server shares are required to reconstruct the server secret key. Although three server shares 155 are depicted in FIG. 1, the device 120 may divide the server secret key into any number of server shares 155. In some embodiments, the server secret key may be divided into a different number of shares than the user device secret key. Alternatively or additionally, the device 120 may divide the server secret key into server shares 155 such that any number of server shares 155 may be required to reconstruct the server secret key. For example, in some embodiments, one server share 155 may be required to reconstruct the server secret key, two server shares 155 may be required to reconstruct the server secret key, or three server shares 155 may be required to reconstruct the user device secret key. In some embodiments, the number of user device shares 135 required to reconstruct the user device secret key may be different from the number of server shares 155 required to reconstruct the server secret key.

In some embodiments, the device 120 may be configured to obtain a public key 175, vk, from the combined secret key. For example, in some embodiments, the public key 175 may be obtained as $vk=g^s$.

In some embodiments, the device 120 may be configured to provide the user device shares 135 to the user devices 130, the recovery vault secret key 145 to the recovery vault 140, the server shares 155 to the service providers 150, the recovery authority secret key 165 to the recovery authority 160, and the public key 175 to the blockchain 170. In some embodiments, the device 120 may be configured to provide one or more of the server shares 155 to the service providers 150 and the recovery authority secret key 165 to the recovery authority 160 via an authenticated channel. In some embodiments, the device 120 may be configured to provide more than one user device share 135 to a single user device 130 and/or more than one server share 155 to a single service provider 150. In some embodiments, the device 120 may provide different user device shares 135 to different user devices 130 such that no individual user device share 135 is provided to multiple user devices 130.

In some embodiments, the device 120 may be configured to provide messages to the user devices 130, the recovery vault 140, the service providers 150, and the recovery authority 160 and to receive signatures from the user devices 130, the recovery vault 140, the service providers 150, and the recovery authority 160 as described below with reference to FIGS. 2 and 3.

Each of the user devices 130 may include a computer-based hardware device that includes a processor, memory, and communication capabilities. Some examples of the user devices 130 may include a mobile phone, a smartphone, a tablet computer, a laptop computer, a desktop computer, a set-top box, a virtual-reality device, or a connected device, etc. The user devices 130 may include a processor-based computing device. For example, the user devices 130 may include a hardware server or another processor-based computing device configured to function as a server. The user devices 130 may include memory and network communication capabilities. In some embodiments, the user devices 130 may include a computing system such as described below with respect to FIG. 7.

The user devices 130 may be different devices that are associated with a particular user. For example, the user device 130A may be a laptop and/or desktop computer associated with the user, the user device 130B may be a hardware token and/or USB device associated with the user, and the user device 130C may be a smart cellular telephone associated with the user. Each of the user devices 130 may include a corresponding user device share 135. For example, the user device 1 130A may include the user device share 1 135A, the user device 2 130B may include the user device share 2 135B, and the user device 3 130C may include the user device share 3 135C. In some embodiments, one or more user device 130 may include multiple user device shares 135.

In some embodiments, one or more of the user devices 130 may not be connected to the network 110. In these and other embodiments, one or more of the user devices 130 may be physically connected to the device 120. Alternatively or additionally, in some embodiments, a user may manually enter information into the user devices 130. For example, in some embodiments, a user device 130 may be a USB device may be plugged into the device 120 and may obtain messages and/or the user device shares 135 via the USB connection. Alternatively or additionally, in some embodiments, a user device 130 may be connected to the device 120 via a Bluetooth connection or other wireless connection but may not be connected to the network 110 or other devices of the environment 100. Alternatively or additionally, in some embodiments, a user may enter information into the user device 130 manually. For example, the user may manually enter the user device share 135 into the user device 130. Alternatively or additionally, in some embodiments, the user device share 135 may be derived from a password hash.

In some embodiments, the user devices 130 may be configured to generate signatures based on the user device shares 135 and a message, as discussed below with respect to FIG. 2.

The recovery vault 140 may include a computer-based hardware device that includes a processor, memory, and communication capabilities. Some examples of the recovery vault 140 may include a mobile phone, a smartphone, a tablet computer, a laptop computer, a desktop computer, a set-top box, a virtual-reality device, or a connected device, etc. The recovery vault 140 may include a processor-based computing device. For example, the recovery vault 140 may include a hardware server or another processor-based computing device configured to function as a server. The recovery vault 140 may include memory and network communication capabilities. In some embodiments, the recovery vault 140 may include a computing system such as described below with respect to FIG. 7. Alternatively or additionally, in some embodiments, the recovery vault 140 may include an account and/or device stored at a secure location away from the user and the user devices 130. For example, the recovery vault 140 may include a device associated with a bank.

In some embodiments, the recovery vault 140 may not be connected to the network 110. In these and other embodiments, the recovery vault 140 may be physically connected to the device 120. Alternatively or additionally, in some embodiments, the recovery vault 140 may be stored at a location away from the user and/or the user devices 130. In some embodiments, a user may manually enter information into the recovery vault 140. For example, in some embodiments, the recovery vault 140 may be a USB device may be plugged into the device 120 and may obtain messages and/or the recovery vault secret key via the USB connection. Alternatively or additionally, in some embodiments, the recovery vault 140 may be connected to the device 120 via a Bluetooth connection or other wireless connection but may not be connected to the network 110 or other devices of the environment 100. Alternatively or additionally, in some embodiments, a user may enter information into the recovery vault 140 manually. For example, the user may manually enter the recovery vault secret key 145 into the recovery vault 140.

In some embodiments, the recovery vault 140 may be configured to generate a signature based on the recovery vault secret key 145 and a message, as discussed below with respect to FIG. 3.

Each of the service providers 150 may include a computer-based hardware device that includes a processor, memory, and communication capabilities. The service providers 150 may be coupled to the network 110 to communicate data with any of the other components of the environment 100. In some embodiments, the service providers 150 may communicate with other components of the environment 100 through the network 110 over authenticated channels. In some embodiments, each of the service providers 150 may be associated with entities different from the user of the device 120. Some examples of the service providers 150 may include a mobile phone, a smartphone, a tablet computer, a laptop computer, a desktop computer, a set-top box, a virtual-reality device, or a connected device, etc. The service providers 150 may include a processor-based computing device. For example, the service providers 150 may include a hardware server or another processor-based computing device configured to function as a server. The service providers 150 may include memory and network communication capabilities. In some embodiments, the service providers 150 may include a computing system such as described below with respect to FIG. 7.

The service providers 150 may be different entities associated with blockchain transactions and/or entities that provide transaction services for blockchain transactions. For example, the service providers 150 may be associated with banks, exchanges, and/or other trusted entities that may process or engage in transactions. Each of the service providers 150 may include a corresponding server share 155. For example, the service provider 1 150A may include the server share 1 155A, the service provider 2 150B may include the server share 2 155B, and the service provider 3 150C may include the server share 3 155C. In some embodiments, one or more service provider 150 may include multiple server shares 155.

In some embodiments, the service providers 150 may be configured to generate signatures based on the server shares 155 and a message, as discussed below with respect to FIG. 2.

The recovery authority 160 may include a computer-based hardware device that includes a processor, memory, and communication capabilities. The recovery authority 160 may be coupled to the network 110 to communicate data with any of the other components of the environment 100. In some embodiments, the recovery authority 160 may communicate with other components of the environment 100 through the network 110 over authenticated channels. In some embodiments, the recovery authority 160 may be associated with entities different from the user of the device 120 and different from the service providers 150. Some examples of the recovery authority 160 may include a mobile phone, a smartphone, a tablet computer, a laptop computer, a desktop computer, a set-top box, a virtual-reality device, or a connected device, etc. The recovery authority 160 may include a processor-based computing device. For example, the recovery authority 160 may include a hardware server or another processor-based computing device configured to function as a server. The recovery authority 160 may include memory and network communication capabilities. In some embodiments, the recovery authority 160 may include a computing system such as described below with respect to FIG. 7.

In some embodiments, the recovery authority 160 may be similar to the service providers 150. In some embodiments, the recovery authority 160 may be a different entity associated with blockchain transactions and/or an entity that provides transaction services for blockchain transactions. For example, the recovery authority 160 may be associated with a bank, an exchange, a network security company, an internet security company, and/or other trusted entities that may process or engage in transactions. In some embodiments, the recovery authority 160 may be an entity that does not process or engage in transactions but may instead be an entity that securely stores secret keys. The recovery authority 160 may include a recovery authority secret key 165.

In some embodiments, the recovery authority 160 may be configured to generate a signature based on the recovery authority secret key 165 and a message, as discussed below with respect to FIG. 3.

An example description of the operation of environment 100 with respect to the generation of secret keys follows. Descriptions of the operation of engaging in transactions and recovering secret keys are found below with reference to FIGS. 2 and 3, respectively.

During setup of a secured account, such as an account for transacting on the blockchain 170, the device 120 may obtain multiple secret keys using the public parameters of the blockchain 170. For example, the device 120 may obtain the combined secret key, the user device secret key, the server secret key, the recovery authority secret key 165, and the recovery vault secret key 145. The device 120 may also obtain the public key 175 based on the combined secret key. The device 120 may divide the user device secret key into the multiple user device shares 135 and may divide the server secret key into the multiple server shares 155. The device 120 may distribute the user device shares 135 to multiple user devices 130 and may distribute the recovery vault secret key 145 to the recovery vault 140. The device 120 may also distribute the server shares 155 to multiple service providers 150 over an authenticated channel and may distribute the recovery authority secret key 165 to the recovery authority 160 over an authenticate channel. Finally, the device 120 may publish the public key 175 to the blockchain 170, such as to a blockchain verification node of the blockchain 170.

Modifications, additions, or omissions may be made to FIG. 1 without departing from the scope of the present disclosure. For example, the environment 100 may include more or fewer elements than those illustrated and described in the present disclosure. For example, in some embodiments, the environment 100 may include more or fewer than the three user devices 130 and/or more or fewer than the three service providers 150. Alternatively or additionally, in some embodiments, the environment 100 may include more than one recovery vault 140 and/or more than one recovery authority 160. Alternatively or additionally, in some embodiments, the environment 100 may not include the recovery vault 140 or the recovery authority 160. Moreover, in some embodiments, the device 120 may not be in the control and/or possession of the user and may be a device operated and/or owned by a third-party. The delineation between these and other elements in the description is not limiting and is meant to aid in understanding and explanation of the concepts and principles used in the present disclosure. Alternatively or additionally, in some embodiments, one or more of the device 120, the user devices 130, the recovery vault 140, the service providers 150, the recovery authority 160, and the blockchain 170 may be distributed across different systems.

Figure 2:
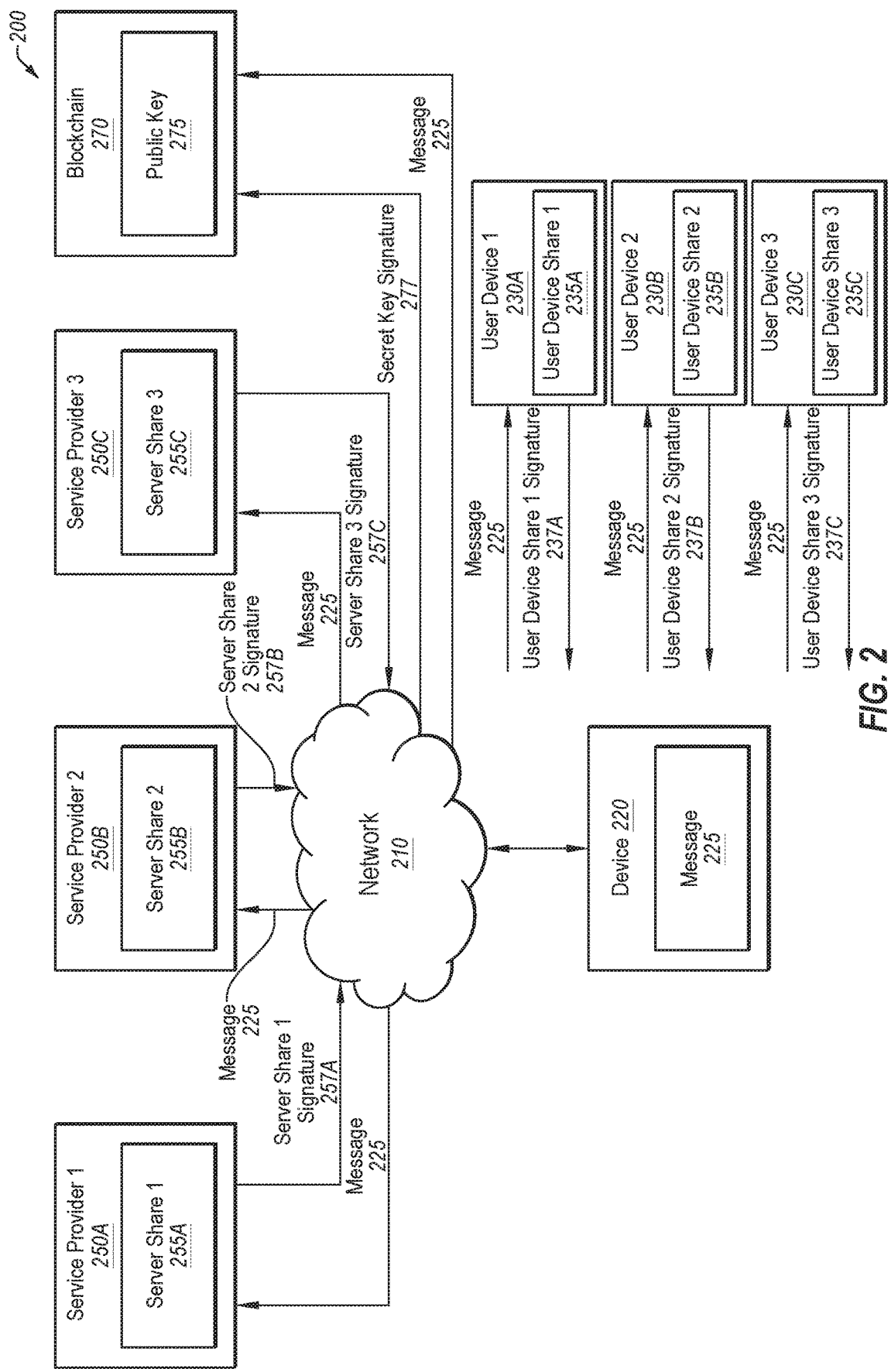
FIG. 2 is a diagram representing an example environment related to engaging in a transaction using a secure key management system.

FIG. 2 is a diagram representing an example environment 200 related to engaging in a transaction using a secure key management system. The environment 200 may include a network 210; a device 220; a user device 1 230A, a user device 2 230B, and a user device 3 230C (collectively the user devices 230); a service provider 1 250A, a service provider 2 250B, and a service provider 3 250C (collectively the service providers 250); and a blockchain 270. Each of the components depicted in FIG. 2 may be analogous to the similarly numbered components of FIG. 1. For example, the device 220 may be analogous to the device 120 and may represent the same device after the generation of secret keys described above with respect to FIG. 1 and during a transaction. In some embodiments, the environment 200 may include the same or similar public parameters as the environment 100 of FIG. 1. For example, the environment 200 may include the multiple bilinear groups $G_1$, $G_2$, and $G_T$ of order q, g a generator of $G_1$, and H a CRHF. The public parameters may also include the integers $t_0$, $n_0$, $t_1$, and $n_1$.

To engage in a transaction, the device 220 may obtain a message 225. The message 225 may include details of a proposed transaction such as an amount of funds to be transferred and a destination for the funds, etc. The device 220 may distribute the message 225 to the multiple user devices 230. For example, in some embodiments, the device 220 may distribute the message 225 to each user device 230 to which a user device share 235 was distributed as discussed above with reference to FIG. 1. Alternatively or additionally, in some embodiments, the device 220 may distribute the message 225 to a subset of the user devices 230 to which a user device share 235 was distributed. In some embodiments, the device 220 may distribute the message 225 to the user devices 230 via a USB connection, via a wireless connection, and/or via the internet. For example, in some embodiments, one or more of the user devices 230 may be connected to the device 220 via the internet. In response to message 225 requesting the initiation of a transaction via the device 220, a request to approve the transaction may be pushed to one or more of the user devices 230 via the internet. For example, an application on the user device 1 230A may receive a notification that the user is attempting to engage in a transaction together with a request to approve the transaction. Alternatively or additionally, in some embodiments, a user may manually enter the message into each user device 230.

After receiving the message 225, each of the user devices 230 may obtain a user device share signature 237 based on the corresponding user device share 235 and the message 225. For example, the user device 1 230A may obtain a user device share 1 signature 237A based on the message 225 and the user device share 1 235A, the user device 2 230 B may obtain a user device share 2 signature 237B based on the message 225 and the user device share 2 235B, and the user device 3 230 C may obtain a user device share 3 signature 237C based on the message 225 and the user device share 3 235C. In some embodiments, signatures may include combinations of a message and a secret key. For example, a signature may represent a mathematical combination of a message and a secret key such that, using the message and a public key, a third-party may verify that the signature was generated from the message and the secret key without knowledge of the secret key. In some embodiments, the user device share signatures 237 obtained by each of the user devices 230 may be a Boneh-Lynn-Shacham (BLS) signature as described by Boneh, Dan, et al., *Short Signatures from the Weil pairing*, International Conference on the Theory and Application of Cryptology and Information Security, Springer, Berlin, Heidelberg, (2001), which is incorporated by reference in its entirety. For example, the user device 1 230A may obtain the user device share 1 signature 237A as $\sigma_{0,1}=(H(m))^{s_{0,1}}$, where $\sigma_{0,1}$ represents the user device share 1 signature 237A, m represents the message, H is the public parameter CRHF discussed above, and $s_{0,1}$ is the user device share 1 235A. The user device 2 230B and the user device 3 230C may analogously obtain the user device share 2 signature 237B as $\sigma_{0,2}=(H(m))^{s_{0,2}}$ and the user device share 3 signature 237C as $\sigma_{0,3}=(H(m))^{s_{0,3}}$, respectively. Each of the user devices 230 may provide the corresponding user device share signature 237 to the device 220. In some embodiments, each of the user device share signatures 237 may be elements of $G_1$. For example, as discussed above, H may take as an input the message, m, and may output elements of $G_1$.

The device 220 may aggregate the user device share signatures 237 to reconstruct a user device signature. In some embodiments, the device 220 may aggregate the user device share signatures 237 using one or more mathematical operations to generate the combined user device signature. As long as the device 220 obtains at least to user device share signatures 237, the device 220 may use Lagrange interpolation in the exponent to recover $\sigma_0=(H(m))^{s_0}$, the user device signature. As discussed above, $t_0$ may be any number. For example, in some embodiments, $t_0$ may be 1, meaning that the user device signature may be reconstructed from a single user device share signature 237. Alternatively, $t_0$ may be 2, meaning that the user device signature may be constructed from any two user device share signatures 237. Alternatively, $t_0$ may be 3, meaning that the user device signature may be constructed only from all three user device share signatures 237. The values of $t_0$ and $n_0$ are exemplary and the environment 200 may include any number of user device shares 235. For example, in some embodiments, the environment 200 may include ten user device shares 235 such that any six of the user device share signatures 237 may be combined to reconstruct the user device signature (i.e., $t_0=6$ and $n_0=10$). In some embodiments, increasing the ratio of the $t_0$ to $n_0$ may increase the security of the environment 200. Alternatively or additionally, in some embodiments, reducing $n_0$ and or reducing $t_0$ may increase the convenience and/or reduce the security of the environment 200. For example, keeping no constant, when $t_0=1$, the environment 200 may be less secure but more convenient than an environment where $t_0=2$.

The device 220 may also distribute the message 225 to multiple service providers 250. For example, in some embodiments, the device 220 may distribute the message 225 to each service provider 250 to which a server share 255 was distributed as discussed above with reference to FIG. 1. Alternatively or additionally, in some embodiments, the device 220 may distribute the message 225 to a subset of the service providers 250 to which a server share 255 was distributed. For example, one or more of the service providers 250 may be offline or may be unable to receive the message 225. In some embodiments, the device 220 may distribute the message 225 to the service providers 250 via a network 210 using an authenticated channel.

After receiving the message 225, each of the service providers 250 may obtain a server share signature 257 based on the corresponding server share 255 and the message 225. For example, the service provider 1 250B may obtain a server share 1 signature 257A based on the message 225 and the server share 1 255A, the service provider 2 250B may obtain a server share 2 signature 257B based on the message 225 and the server share 2 255B, and the service provider 2 250B may obtain a server share 2 signature 257B based on the message 225 and the server share 2 255B. In some embodiments, the service providers 250 may obtain the server share signatures 257 by combining the server shares 255 with the message 225 using one or more mathematical operations. For example, in some embodiments, the service providers 250 may obtain the server share signatures 257 by hashing the message 225 using the server shares 255. In some embodiments, signatures may include combinations of a message and a secret key. For example, a signature may represent a mathematical combination of a message and a secret key such that, using the message and a public key, a third-party may verify that the signature was generated from the message and the secret key without knowledge of the secret key. In some embodiments, the server share signatures 257 obtained by each of the service providers 250 may be a BLS signature. For example, the service provider 1 250A may obtain the server share 1 signature 257A as $\sigma_{1,1}=(H(m))^{s_{1,1}}$, where $\sigma_{1,1}$ represents the server share 1 signature 257A and $s_{1,1}$ is the server share 1 255A. The service provider 2 250B and the service provider 3 250C may analogously obtain the server share 2 signature 237B as $\sigma_{1,2}=(H(m))^{s_{1,2}}$ and the server share 3 signature 257C as $\sigma_{1,3}=(H(m))^{s_{1,3}}$, respectively. Each of the service providers 250 may provide the corresponding server share signature 257 to the device 220. In some embodiments, the service providers 250 may provide the corresponding server share signatures 257 to the device 220 via an authenticated channel.

The device 220 may aggregate the server share signatures 257 to reconstruct a server signature. As long as the device 220 obtains at least $t_1$ server share signatures 257, the device 220 may use Lagrange interpolation in the exponent to recover $\sigma_1=(H(m))^{s_1}$, the server signature. Similar to $t_0$ discussed above, $t_1$ may be any number. For example, in some embodiments, $t_1$ may be 1, 2, or 3, meaning that the server signature may be reconstructed from the corresponding number of server share signatures 257. The values of $t_1$ and $n_1$ are exemplary and the environment 200 may include any number of server shares 255. For example, in some embodiments, the environment 200 may include fifteen server shares 255 such that any five of the server share signatures 257 may be combined to reconstruct the server signature (i.e., $t_1=5$ and $n_1=15$).

After obtaining the user device signature $\sigma_0$ and the server signature $\sigma_1$, the device 220 may aggregate the user device signature and the server signature to obtain a secret key signature 277, $\sigma=\sigma_0 \cdot \sigma_1$. The device 220 may then send the message 225 and the secret key signature 277 to the blockchain 270. The blockchain 270 may verify the message 225 using the secret key signature 277 and the public key 275. For example, the blockchain 270 may verify that $e(\sigma, g)=e(H(m), vk)$. After verification, the blockchain 270 may process the transaction described in the message 225.

In some embodiments, a user, such as the user associated with the device 220 and the user devices 230 may block transactions from being processed by the blockchain 270. For example, the device 220, user name/password credentials associated with the blockchain 270, and/or the user devices 230 may be compromised. In response, the user may contact the service providers 250 to request the service providers 250 to not provide server share signatures 257 in response to obtaining the message 225 from the device 220. In some embodiments, the user may communicate with the service providers 250 in an offline manner, e.g., by telephone rather than through the internet. If at least $n_1-t_1+1$ service providers respond to the block request, the device 220 may be unable to obtain the server signature from any server signature shares 257 that are obtained from any service providers 250 that did not respond to the block request.

Modifications, additions, or omissions may be made to FIG. 2 without departing from the scope of the present disclosure. For example, the environment 200 may include more or fewer elements than those illustrated and described in the present disclosure. For example, in some embodiments, the environment 200 may include more or fewer than three user devices 230 and/or more or fewer than three service providers 250. Alternatively or additionally, in some embodiments, the environment 200 may include a recovery vault and/or a recovery authority. The delineation between these and other elements in the description is not limiting and is meant to aid in understanding and explanation of the concepts and principles used in the present disclosure. Alternatively or additionally, in some embodiments, one or more of the device 220, the user devices 230, the service providers 250, and the blockchain 270 may be distributed across different systems.

Figure 3:
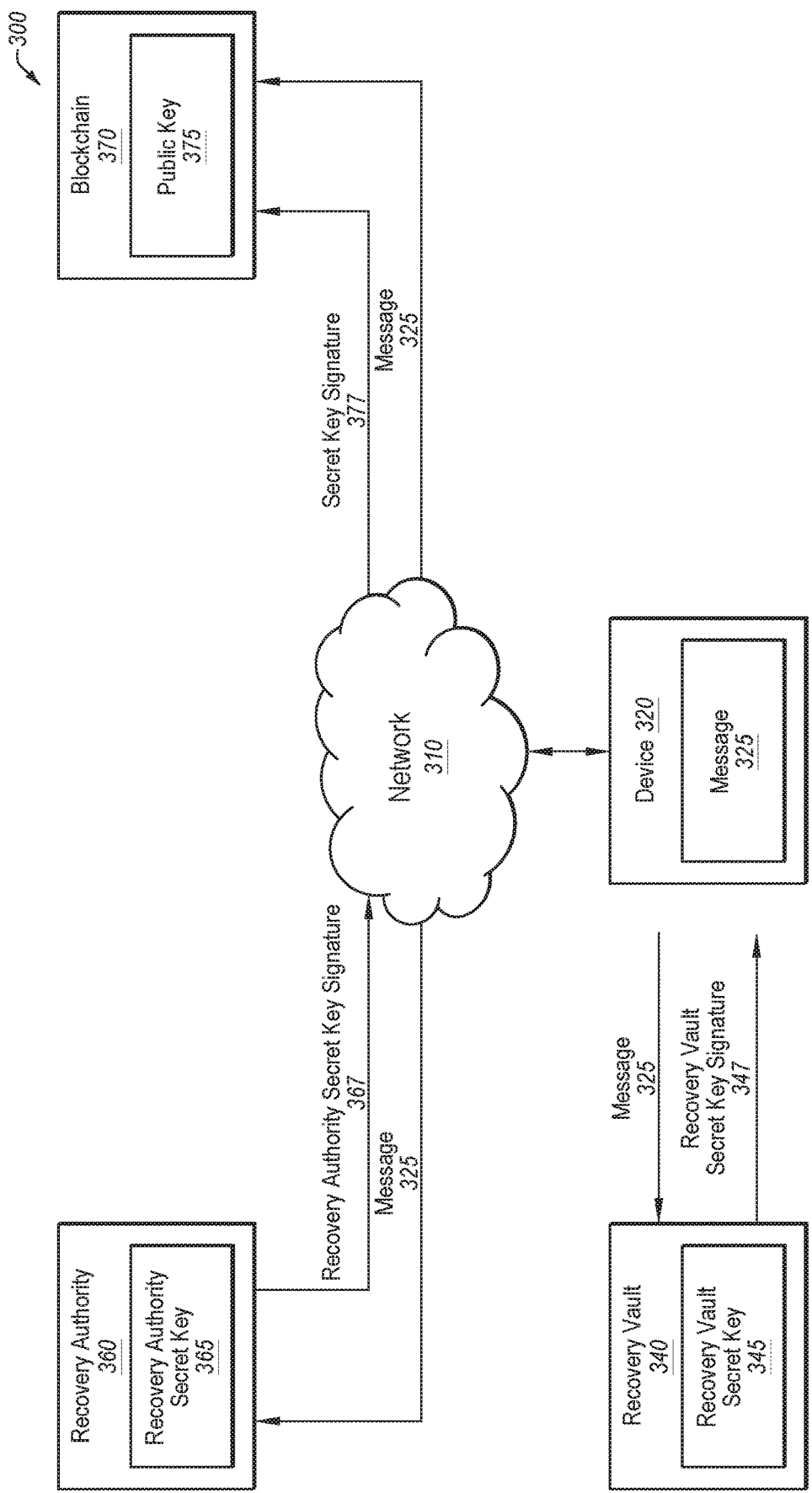
FIG. 3 is a diagram representing an example environment related to recovering an account using a secure key management system.

FIG. 3 is a diagram representing an example environment 300 related to recovering an account using a secure key management system. The environment 300 may include a network 310; a device 320; a recovery vault 340; a recovery authority 360; and a blockchain 370. Each of the components depicted in FIG. 3 may be analogous to the similarly numbered components of FIG. 1. For example, the device 320 may be analogous to the device 120 and may represent the same device after the generation of secret keys described above with respect to FIG. 1 and during a recovery of an account. In some embodiments, the environment 300 may include the same or similar public parameters as the environment 100 of FIG. 1. For example, the environment 300 may include the multiple bilinear groups $G_1$, $G_2$, and $G_T$, g a generator of $G_1$, and H a CRHF that takes as input a bit string and outputs an element of $G_1$. The public parameters may also include the integers $t_0$, $n_0$, $t_1$, and $n_1$.

In some embodiments, a user may block transactions after the user's authentication mechanism and/or user devices are compromised. Alternatively or additionally, in some embodiments, the user may lose access to a number of user devices required to engage in a transaction. To remedy these situations, the user may recover the account. To recover an account, the device 320 may obtain a message 325. The message 325 may include details of a proposed transaction such as a transfer of the funds in the existing account to a new account that may potentially be associated with different service providers and/or different user devices. The device 320 may distribute the message 325 to the recovery vault 340. In some embodiments, the device 320 may distribute the message 325 to the recovery vault 340 via a USB connection, via a wireless connection, and/or via the internet. For example, in some embodiments, the recovery vault 340 may be connected to the device 320 via the internet. In response to a user requesting the recovery of an account via the device 320, a request to approve the recovery may be pushed to the recovery vault 340 via the internet. For example, an application on the recovery vault 340 may receive a notification that the user is attempting to recover the account together with a request to approve the recovery. Alternatively or additionally, in some embodiments, a user may manually enter the message into the recovery vault 340. Alternatively or additionally, in some embodiments, the recovery vault 340 may include a terminal at another location, such as a terminal at a bank. The user may login to the terminal as the recovery vault 340 and access the message 325.

After receiving the message 325, the recovery vault 340 may obtain a recovery vault secret key signature 347 based on the corresponding recovery vault secret key 345 and the message 325. In some embodiments, the recovery vault 340 may obtain the recovery vault secret key signature 347 by combining the recovery vault secret key 345 with the message 325 using one or more mathematical operations. For example, in some embodiments, the recovery vault 340 may obtain the recovery vault secret key signature 347 by hashing the message 325 using the recovery vault secret key 345. In some embodiments, the recovery vault secret key signature 347 may be a BLS signature. For example, the recovery vault 340 may obtain the recovery vault secret key signature 347 as $\sigma_{r_0} = (H(m))^{r_0}$, where $\sigma_{r_0}$ represents the recovery vault secret key signature 347, m represents the message, H is the public parameter CRHF discussed above, and $r_0$ is the recovery vault secret key 345. The recovery vault 340 may provide the recovery vault secret key signature 347 to the device 320.

The device 320 may also distribute the message 325 to the recovery authority 360. In some embodiments, the device 320 may distribute the message 325 to the recovery authority 360 via the network 310 using an authenticated channel.

After receiving the message 325, the recovery authority 360 may obtain a recovery authority secret key signature 367 based on the recovery authority secret key 365 and the message 325. In some embodiments, the recovery authority 360 may obtain the recovery authority secret key signature 367 by combining the recovery authority secret key 365 with the message 325 using one or more mathematical operations. For example, in some embodiments, the recovery vault 340 may obtain the recovery vault secret key signature 367 by hashing the message 325 using the recovery authority secret key 365. For example, the recovery authority 360 may obtain the recovery authority secret key 367 as $\sigma_{r_1} = (H(m))^{r_1}$, where $\sigma_{r_1}$ represents the recovery authority secret key signature 367 and $r_1$ is the recovery authority secret key 365. In some embodiments, the recovery authority 360 may provide the recovery authority secret key signature 367 to the device 320 via an authenticated channel.

After obtaining the recovery vault secret key signature 347 ($\sigma_{r_0}$) and the recovery authority secret key signature 367 ($\sigma_{r_1}$), the device 320 may aggregate the recovery vault secret key signature 347 and the recovery authority secret key signature 367 to obtain a secret key signature 377, $\sigma = \sigma_{r_0} \cdot \sigma_{r_1}$. The device 320 may send the message 325 and the secret key signature 377 to the blockchain 370. The blockchain 370 may verify the message 325 using the secret key signature 377 and the public key 375. For example, the blockchain 370 may verify that $e(\sigma, g) = e(H(m), vk)$. After verification, the blockchain 370 may process the recovery described in the message 325 by, for example, transferring funds from a compromised to a new account. In some embodiments, the blockchain 370 may process the recovery described in the message 325 without obtaining any user device signature shares and/or without obtaining any server signature shares.

Modifications, additions, or omissions may be made to FIG. 3 without departing from the scope of the present disclosure. For example, the environment 300 may include more or fewer elements than those illustrated and described in the present disclosure. For example, in some embodiments, the environment 300 may include more than one recovery vault 340 and/or more than one recovery authority 360. In these and other embodiments, each recovery vault 340 and/or recovery authority 360 may include one or more shares of the corresponding secret key. In these and other embodiments, the device 320 may reconstruct the recovery vault secret key signature 347 and/or the recovery authority secret key signature 367 using Lagrange interpolation, similar to the user device signature and the server signature as described above with reference to FIG. 2. Alternatively or additionally, in some embodiments, the environment 300 may include one or more user devices and/or one or more service providers. The delineation between these and other elements in the description is not limiting and is meant to aid in understanding and explanation of the concepts and principles used in the present disclosure. Alternatively or additionally, in some embodiments, one or more of the device 320, the recovery vault 340, the recovery authority 360, and the blockchain 370 may be distributed across different systems.

Figure 4:
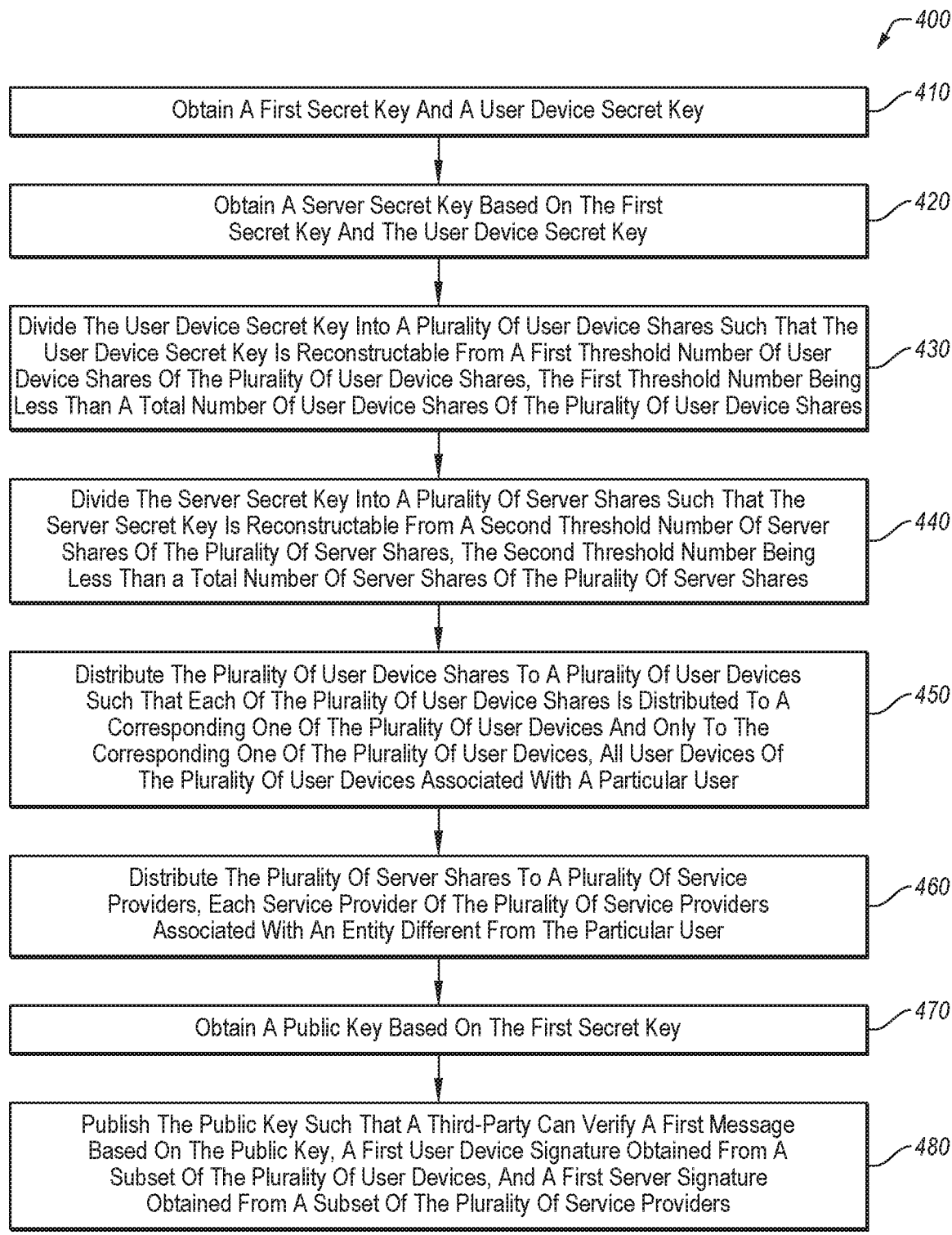
FIG. 4 is a flowchart of an example method of establishing a secure key management system.

FIG. 4 is a flowchart of an example method 400 of establishing a secure key management system. The method 400 may be arranged in accordance with at least one embodiment described in the present disclosure. One or more of the operations of the method 400 may be performed, in some embodiments, by one or more of the devices of the environments of FIGS. 1, 2, and/or 3, or any other suitable devices or systems described in this disclosure. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

At block 410, a first secret key and a user device secret key may be obtained. At block 420, a server secret key may be obtained based on the first secret key and the user device secret key.

At block 430, the user device secret key may be divided into a plurality of user device shares such that the user device secret key is reconstructable from a first threshold number of user device shares of the plurality of user device shares. The first threshold number may be less than a total number of user device shares of the plurality of user device shares. At block 440, the server secret key may be divided into a plurality of server shares such that the server secret key is reconstructable from a second threshold number of server shares of the plurality of server shares. The second threshold number may be less than a total number of server shares of the plurality of server shares.

At block 450, the plurality of user device shares may be distributed to a plurality of user devices such that each of the plurality of user device shares is distributed to a corresponding one of the plurality of user devices and only to the corresponding one of the plurality of user devices. All user devices of the plurality of user devices may be associated with a particular user.

At block 460, the plurality of server shares may be distributed to a plurality of service providers. Each service provider of the plurality of service providers may be associated with an entity different from the particular user. In some embodiments, the plurality of server shares may be distributed via an authenticated channel. At block 470, a public key may be obtained based on the first secret key.

At block 480, the public key may be published such that a third-party can verify a first message based on the public key, a first user device signature obtained from a subset of the plurality of user devices, and a first server signature obtained from a subset of the plurality of service providers. In some embodiments, the public key may be published to a digital wallet on a blockchain.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 400 may include more or fewer elements than those illustrated and described in the present disclosure. For example, in some embodiments, the method 400 may include one or more blocks described below with respect to the method 500 of FIG. 5 and/or the method 600 of FIG. 6. In some embodiments, operations that are described as being performed by a server and operations that are described as being performed by a user device may happen in parallel. Alternatively or additionally, in some embodiments, the method 400 may include obtaining a recovery vault secret key. In these and other embodiments, the method 400 may further include obtaining a recovery authority secret key based on the first secret key and the recovery vault secret key. In these and other embodiments, the method 400 may also include distributing the distributing the recovery vault secret key to a recovery vault. The recovery vault may be associated with the particular user. The recovery vault may be a device distinct from the plurality of user devices. In these and other embodiments, the method 400 may also include distributing the recovery authority secret key to a recovery authority. The recovery authority may be associated with an entity different from the particular user. The recovery authority may be a secure repository for secret keys. In some embodiments, the recovery authority secret key may be distributed to the recovery authority via an authenticated channel.

Figure 5:
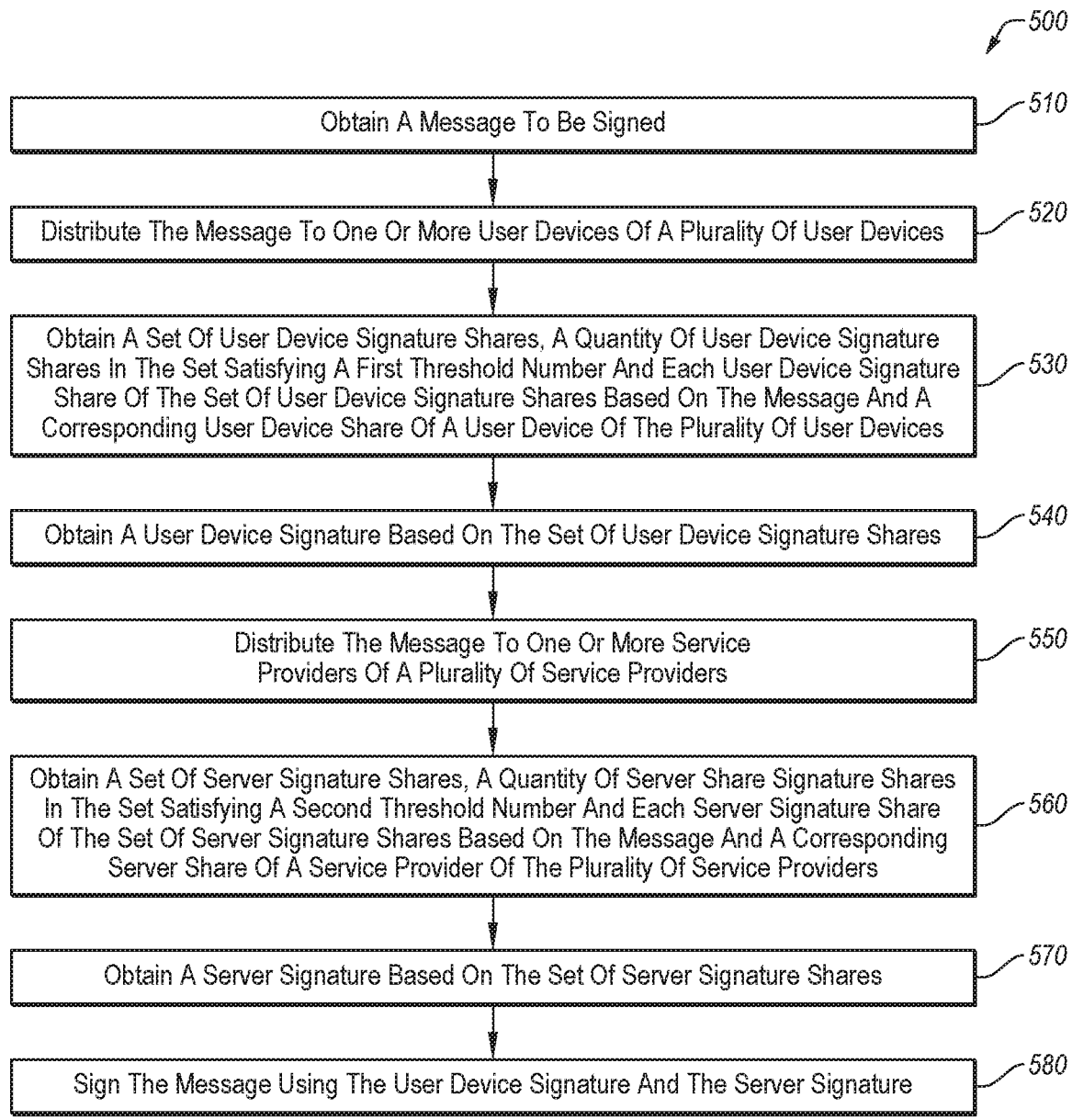
FIG. 5 is a flowchart of an example method of engaging in a transaction using a secure key management system.

FIG. 5 is a flowchart of an example method 500 of engaging in a transaction using a secure key management system. The method 500 may be arranged in accordance with at least one embodiment described in the present disclosure. One or more of the operations of the method 500 may be performed, in some embodiments, by one or more of the devices of the environments of FIGS. 1, 2, and/or 3, or any other suitable devices or systems described in this disclosure. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

At block 510, a message to be signed may be obtained. At block 520, the message may be distributed to one or more user devices of a plurality of user devices. At block 530, a set of user device signature shares may be obtained. A quantity of user device signature shares in the set may satisfy a first threshold number and each user device signature share of the set of user device signature shares may be based on the message and a corresponding user device share of a user device of the plurality of user devices. At block 540, a user device signature may be obtained based on the set of user device signature shares.

At block 550, the message may be distributed to one or more service providers of a plurality of service providers. In some embodiments, the message may be distributed via an authenticated channel. At block 560, a set of server signature shares may be obtained. A quantity of server share signature shares in the set may satisfy a second threshold number and each server signature share of the set of server signature shares may be based on the message and a corresponding server share of a service provider of the plurality of service providers. In some embodiments, the set of server signature shares may be obtained via an authenticated channel. At block 570, a server signature may be obtained based on the set of server signature shares.

At block 580, the message may be signed using the user device signature and the server signature.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 6:
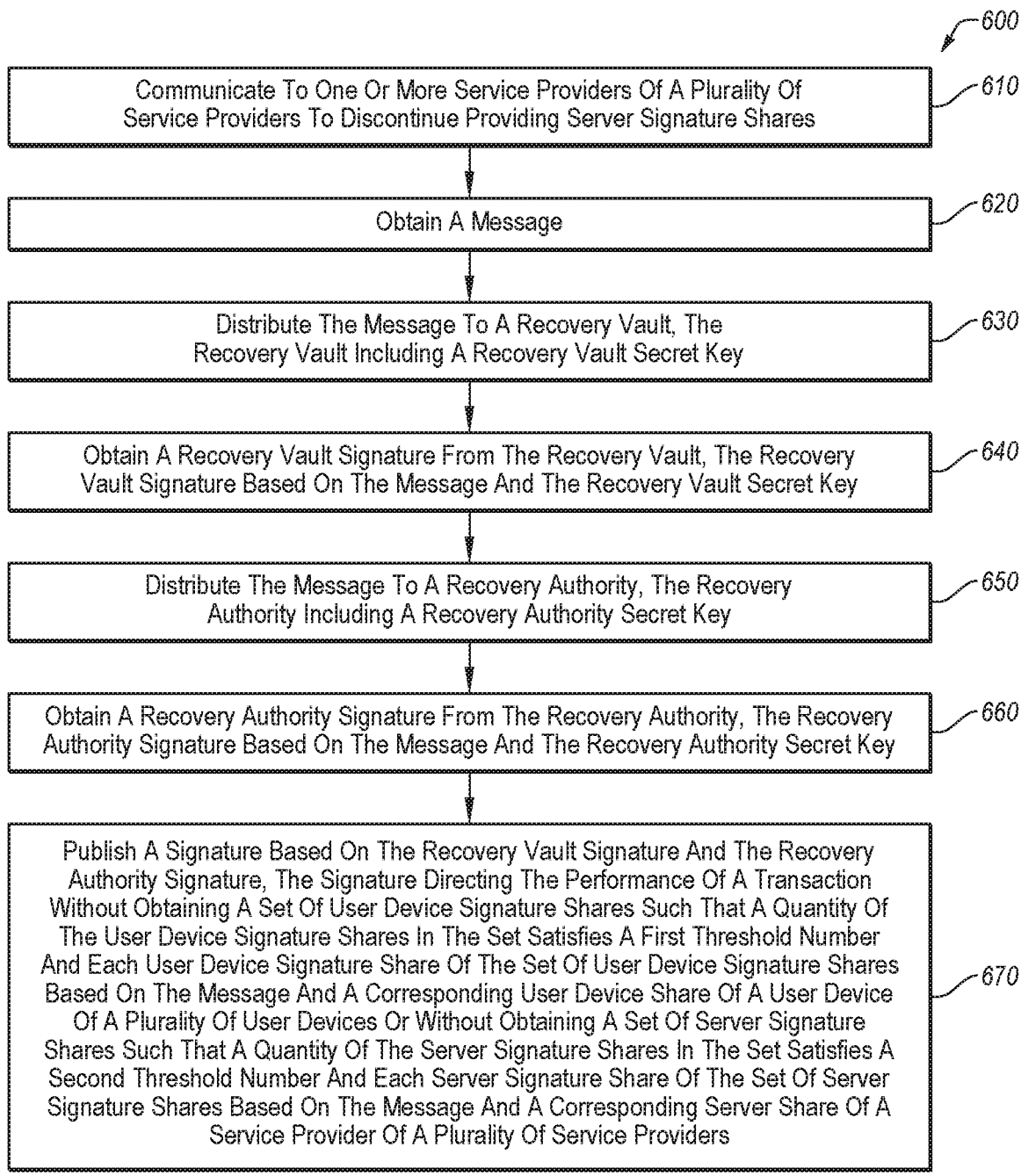
FIG. 6 is a flowchart of an example method of recovering an account in a secure key management system.

FIG. 6 is a flowchart of an example method 600 of recovering an account in a secure key management system. The method 600 may be arranged in accordance with at least one embodiment described in the present disclosure. One or more of the operations of the method 600 may be performed, in some embodiments, by one or more of the devices of the environments of FIGS. 1, 2, and/or 3, or any other suitable devices or systems described in this disclosure. In these and other embodiments, the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

At block 610, it may be communicated to one or more service providers of a plurality of service providers to discontinue providing server signature shares. At block 620, a message may be obtained.

At block 630, the message may be distributed to a recovery vault. The recovery vault may include a recovery vault secret key. At block 640, a recovery vault signature may be obtained from the recovery vault. The recovery vault signature may be based on the message and the recovery vault secret key.

At block 650, the message may be distributed to a recovery authority. The recovery authority may include a recovery authority secret key. In some embodiments, the message may be distributed via an authenticated channel. At block 660, a recovery authority signature may be obtained from the recovery authority. The recovery authority signature may be based on the message and the recovery authority secret key. In some embodiments, the recovery authority signature may be obtained via an authenticated channel.

At block 670, a signature may be published based on the recovery vault signature and the recovery authority signature. The signature may direct the performance of a transaction without obtaining a set of user device signature shares such that a quantity of the user device signature shares in the set satisfies a first threshold number and each user device signature share of the set of user device signature shares based on the message and a corresponding user device share of a user device of a plurality of user devices or without obtaining a set of server signature shares such that a quantity of the server signature shares in the set satisfies s second threshold number and each server signature share of the set of server signature shares based on the message and a corresponding server share of a service provider of a plurality of service providers.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

FIG. 7 illustrates a block diagram of an example computing system 702 that may be configured to operate a secure key management system, according to at least one embodiment of the present disclosure. The computing system 702 may be configured to implement or direct one or more operations associated with a device (e.g., the device 120 of FIG. 1), a user device (e.g., the user devices 130 of FIG. 1), a recovery vault (e.g., the recovery vault 140 of FIG. 1), a service provider (e.g., the service providers 150 of FIG. 1, a recovery authority (e.g., the recovery authority 160 of FIG. 1), and/or a blockchain (e.g., the blockchain 170 of FIG. 1). The computing system 702 may include a processor 750, a memory 752, and a data storage 754. The processor 750, the memory 752, and the data storage 754 may be communicatively coupled.

In general, the processor 750 may include any suitable special-purpose or general-purpose computer, computing entity, or processing device including various computer hardware or software modules and may be configured to execute instructions stored on any applicable computer-readable storage media. For example, the processor 750 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 7, the processor 750 may include any number of processors configured to, individually or collectively, perform or direct performance of any number of operations described in the present disclosure. Additionally, one or more of the processors may be present on one or more different electronic devices, such as different servers.

In some embodiments, the processor 750 may be configured to interpret and/or execute program instructions and/or process data stored in the memory 752, the data storage 754, or the memory 752 and the data storage 754. In some embodiments, the processor 750 may fetch program instructions from the data storage 754 and load the program instructions in the memory 752. After the program instructions are loaded into memory 752, the processor 750 may execute the program instructions.

For example, in some embodiments, the one or more blocks in the methods 400, 500, and/or 600 of FIGS. 4, 5, and 6, respectively, may be included in the data storage 754 as program instructions. The processor 750 may fetch the program instructions of the methods from the data storage 754 and may load the program instructions of the methods in the memory 752. After the program instructions of the methods are loaded into memory 752, the processor 750 may execute the program instructions such that the computing system may implement the operations associated with the methods as directed by the instructions.

The memory 752 and the data storage 754 may include computer-readable storage media for carrying or having computer-executable instructions or data structures stored thereon. Such computer-readable storage media may include any available media that may be accessed by a general-purpose or special-purpose computer, such as the processor 750. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 750 to perform a certain operation or group of operations.

Modifications, additions, or omissions may be made to the computing system 702 without departing from the scope of the present disclosure. For example, in some embodiments, the computing system 702 may include any number of other components that may not be explicitly illustrated or described.

As indicated above, the embodiments described in the present disclosure may include the use of a special purpose or general purpose computer (e.g., the processor 750 of FIG. 7) including various computer hardware or software modules, as discussed in greater detail below. Further, as indicated above, embodiments described in the present disclosure may be implemented using computer-readable media (e.g., the memory 752 or data storage 754 of FIG. 7) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
obtaining a first secret key and a user device secret key;
obtaining a server secret key based on the first secret key and the user device secret key;
dividing the user device secret key into a plurality of user device shares such that the user device secret key is reconstructable from a first threshold number of user device shares of the plurality of user device shares, the first threshold number being less than a total number of user device shares of the plurality of user device shares;
dividing the server secret key into a plurality of server shares such that the server secret key is reconstructable from a second threshold number of server shares of the plurality of server shares, the second threshold number being less than a total number of server shares of the plurality of server shares;
distributing the plurality of user device shares to a plurality of user devices such that each of the plurality of user device shares is distributed to a corresponding one of the plurality of user devices and only to the corresponding one of the plurality of user devices, all user devices of the plurality of user devices associated with a particular user;
distributing the plurality of server shares to a plurality of service providers, each service provider of the plurality of service providers associated with an entity different from the particular user;
obtaining a public key based on the first secret key; and
publishing the public key such that a third-party can verify a first message based on the public key, a first user device signature obtained from a subset of the plurality of user devices, and a first server signature obtained from a subset of the plurality of service providers.

2. The method of claim 1, further comprising:
obtaining a second message to be signed;
distributing the second message to one or more user devices of the plurality of user devices;
obtaining a set of user device signature shares, a quantity of user device signature shares in the set satisfying the first threshold number and each user device signature share of the set of user device signature shares based on the second message and a corresponding user device share of a user device of the plurality of user devices;
obtaining a second user device signature based on the set of user device signature shares;
distributing the second message to one or more service providers of the plurality of service providers;
obtaining a set of server signature shares, a quantity of server signature shares in the set satisfying the second threshold number and each server signature share of the set of server signature shares based on the second message and a corresponding server share of a service provider of the plurality of service providers;
obtaining a second server signature based on the set of server signature shares; and
signing the second message using the second user device signature and the second server signature.

3. The method of claim 2 wherein the second message is distributed to the one or more service providers and the set of server signature shares are obtained via an authenticated channel.

4. The method of claim 1, further comprising:
obtaining a recovery vault secret key;
obtaining a recovery authority secret key based on the first secret key and the recovery vault secret key;
distributing the recovery vault secret key to a recovery vault, the recovery vault associated with the particular user and being a device distinct from the plurality of user devices; and
distributing the recovery authority secret key to a recovery authority, the recovery authority associated with an entity different from the particular user and the recovery authority being a secure repository for secret keys.

5. The method of claim 4, further comprising:
communicating to one or more service providers of the plurality of service providers to discontinue providing server signature shares such that a number of service providers that continue to provide server signature shares is less than the second threshold number and a server signature is not reconstructable from server signature shares from the service providers that continue to provider server signature shares;
obtaining the recovery vault secret key from the recovery vault;
obtaining a third message;
distributing the third message to the recovery vault;
obtaining a recovery vault signature based on the third message and the recovery vault secret key;
distributing the third message to the recovery authority;
obtaining a recovery authority signature from the recovery authority, the recovery authority signature based on the third message and the recovery authority secret key; and
publishing a signature based on the recovery vault signature and the recovery authority signature, the signature directing the performance of a transaction without obtaining a set of user device signature shares such that a quantity of the user device signature shares in the set satisfies the first threshold number and each user device signature share of the set of user device signature shares based on the third message and a corresponding user device share of a user device of the plurality of user devices or without obtaining a set of server signature shares such that a quantity of the server signature shares in the set satisfies the second threshold number and each server signature share of the set of server signature shares based on the third message and a corresponding server share of a service provider of the plurality of service providers.

6. The method of claim 1 wherein the public key is published to a digital wallet on a blockchain.

7. At least one non-transitory computer readable medium configured to store one or more instructions that when executed by at least one system perform the method of claim 1.

8. A method comprising:
obtaining a message to be signed;
distributing the message to one or more user devices of a plurality of user devices, all user devices of the plurality of user devices associated with a particular user and each user device of the plurality of user devices including at least one user device share, wherein a user device secret key is reconstructable from a first threshold number of user device shares that is less than a total number of user device shares held by the plurality of user devices;
obtaining a set of user device signature shares, a quantity of user device signature shares in the set satisfying the first threshold number and each user device signature share of the set of user device signature shares based on the message and a corresponding user device share of a user device of the plurality of user devices;

obtaining a user device signature based on the set of user device signature shares;

distributing the message to one or more service providers of a plurality of service providers, each service provider of the plurality of service providers associated with an entity different from the particular user and each service provider of the plurality of service providers including at least one server share, wherein a server secret key is reconstructable from a second threshold number of server shares that is less than a total number of server shares held by the plurality of service providers;

obtaining a set of server signature shares, a quantity of server signature shares in the set satisfying the second threshold number and each server signature share of the set of server signature shares based on the message and a corresponding server share of a service provider of the plurality of service providers;

obtaining a server signature based on the set of server signature shares; and publishing the message, signed using the user device signature and the server signature.

9. The method of claim 8, further comprising engaging in a financial transaction based on the signed message.

10. The method of claim 8 wherein the message is distributed to the one or more service providers and wherein the set of server signature shares are obtained via an authenticated channel.

11. The method of claim 8, further comprising:
obtaining a first secret key and a recovery vault secret key;
obtaining a recovery authority secret key based on the first secret key and the recovery vault secret key;
distributing the recovery vault secret key to a recovery vault, the recovery vault associated with the particular user and being a device distinct from the plurality of user devices; and
distributing the recovery authority secret key to a recovery authority, the recovery authority associated with an entity different from the particular user and the recovery authority being a secure repository for secret keys.

12. The method of claim 11, further comprising:
communicating to one or more service providers of the plurality of service providers to discontinue providing server signature shares such that a number of service providers that continue to provide server signature shares is less than the second threshold number and a server signature is not reconstructable from server signature shares from the service providers that continue to provider server signature shares;
obtaining the recovery vault secret key from the recovery vault;
obtaining a second message;
distributing the second message to the recovery vault;
obtaining a recovery vault signature based on the second message and the recovery vault secret key;
distributing the second message to the recovery authority;
obtaining a recovery authority signature from the recovery authority, the recovery authority signature based on the second message and the recovery authority secret key; and
publishing a signature based on the recovery vault signature and the recovery authority signature, the signature directing the performance of a transaction without obtaining a set of user device signature shares such that a quantity of the user device signature shares in the set satisfies the first threshold number and each user device signature share of the set of user device signature shares based on the second message and a corresponding user device share of a user device of the plurality of user devices or without obtaining a set of server signature shares such that a quantity of the server signature shares in the set satisfies the second threshold number and each server signature share of the set of server signature shares based on the second message and a corresponding server share of a service provider of the plurality of service providers.

13. The method of claim 8 wherein the message is published on a blockchain.

14. At least one non-transitory computer readable medium configured to store one or more instructions that when executed by at least one system perform the method of claim 8.

15. A system comprising:
one or more processors; and
one or more computer-readable media configured to store instructions that in response to being executed by the one or more processors cause the system to perform operations, the operations comprising:
obtaining a first secret key and a user device secret key;
obtaining a server secret key based on the first secret key and the user device secret key;
dividing the user device secret key into a plurality of user device shares such that the user device secret key is reconstructable from a first threshold number of user device shares of the plurality of user device shares, the first threshold number being less than a total number of user device shares of the plurality of user device shares;
dividing the server secret key into a plurality of server shares such that the server secret key is reconstructable from a second threshold number of server shares of the plurality of server shares, the second threshold number being less than a total number of server shares of the plurality of server shares;
distributing the plurality of user device shares to a plurality of user devices such that each of the plurality of user device shares is distributed to a corresponding one of the plurality of user devices and only to the corresponding one of the plurality of user devices, all user devices of the plurality of user devices associated with a particular user;
distributing the plurality of server shares to a plurality of service providers, each service provider of the plurality of service providers associated with an entity different from the particular user;
obtaining a public key based on the first secret key; and
publishing the public key such that a third-party can verify a first message based on the public key, a first user device signature obtained from a subset of the plurality of user devices, and a first server signature obtained from a subset of the plurality of service providers.

16. The system of claim 15, wherein the operations further comprise:
obtaining a second message to be signed;
distributing the second message to one or more user devices of the plurality of user devices;
obtaining a set of user device signature shares, a quantity of user device signature shares in the set satisfying the first threshold number and each user device signature share of the set of user device signature shares based on the second message and a corresponding user device share of a user device of the plurality of user devices;

obtaining a second user device signature based on the set of user device signature shares;

distributing the second message to one or more service providers of the plurality of service providers;

obtaining a set of server signature shares, a quantity of server signature shares in the set satisfying the second threshold number and each server signature share of the set of server signature shares based on the second message and a corresponding server share of a service provider of the plurality of service providers;

obtaining a second server signature based on the set of server signature shares; and signing the second message using the second user device signature and the second server signature.

17. The system of claim 16 wherein the second message is distributed to the one or more service providers and the set of server signature shares are obtained via an authenticated channel.

18. The system of claim 15, wherein the operations further comprise:

obtaining a recovery vault secret key;

obtaining a recovery authority secret key based on the first secret key and the recovery vault secret key;

distributing the recovery vault secret key to a recovery vault, the recovery vault associated with the particular user and being a device distinct from the plurality of user devices; and distributing the recovery authority secret key to a recovery authority, the recovery authority associated with an entity different from the particular user and the recovery authority being a secure repository for secret keys.

19. The system of claim 18, wherein the operations further comprise:

communicating to one or more service providers of the plurality of service providers to discontinue providing server signature shares such that a number of service providers that continue to provide server signature shares is less than the second threshold number and a server signature is not reconstructable from server signature shares from the service providers that continue to provider server signature shares;

obtaining the recovery vault secret key from the recovery vault;

obtaining a third message;

distributing the third message to the recovery vault;

obtaining a recovery vault signature based on the third message and the recovery vault secret key;

distributing the third message to the recovery authority;

obtaining a recovery authority signature from the recovery authority, the recovery authority signature based on the third message and the recovery authority secret key; and publishing a signature based on the recovery vault signature and the recovery authority signature, the signature directing the performance of a transaction without obtaining a set of user device signature shares such that a quantity of the user device signature shares in the set satisfies first threshold number and each user device signature share of the set of user device signature shares based on the third message and a corresponding user device share of a user device of the plurality of user devices or without obtaining a set of server signature shares such that a quantity of the server signature shares in the set satisfies the second threshold number and each server signature share of the set of server signature shares based on the third message and a corresponding server share of a service provider of the plurality of service providers.

20. The system of claim 15 wherein the public key is published to a digital wallet on a blockchain.

* * * * *